(12) United States Patent
Tu et al.

(10) Patent No.: US 11,262,474 B2
(45) Date of Patent: Mar. 1, 2022

(54) MEMS GRAVIMETER

(71) Applicant: Huazhong University of Science and Technology, Hubei (CN)

(72) Inventors: Liangcheng Tu, Hubei (CN); Shihao Tang, Hubei (CN); Jinquan Liu, Hubei (CN); Ji Fan, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 473 days.

(21) Appl. No.: 16/308,239

(22) PCT Filed: Jun. 30, 2017

(86) PCT No.: PCT/CN2017/091111
§ 371 (c)(1),
(2) Date: Dec. 7, 2018

(87) PCT Pub. No.: WO2018/232779
PCT Pub. Date: Dec. 27, 2018

(65) Prior Publication Data
US 2020/0284940 A1 Sep. 10, 2020

(30) Foreign Application Priority Data

Jun. 19, 2017 (CN) .......................... 201710461918.X

(51) Int. Cl.
*G01V 7/08* (2006.01)
*G01V 7/04* (2006.01)

(52) U.S. Cl.
CPC . *G01V 7/08* (2013.01); *G01V 7/04* (2013.01)

(58) Field of Classification Search
CPC ............. G01V 7/005; G01V 7/08; G01V 7/04
See application file for complete search history.

(56) References Cited

U.S. PATENT DOCUMENTS

| 2011/0015862 A1* | 1/2011 | Sato | G01C 21/16 |
| | | | 702/6 |
| 2015/0234085 A1* | 8/2015 | Meyer | G01P 15/125 |
| | | | 73/382 R |

FOREIGN PATENT DOCUMENTS

| CN | 101382564 A | 3/2009 |
| CN | 101654216 A | 2/2010 |

(Continued)

OTHER PUBLICATIONS

Middlemiss, R. P., et al. "Measurement of the Earth tides with a MEMS gravimeter" Nature, vol. 531, Mar. 31, 2016. (Year: 2016).*

(Continued)

*Primary Examiner* — Paul M. West
(74) *Attorney, Agent, or Firm* — Hamre, Schumann, Mueller & Larson, P.C.

(57) ABSTRACT

The present invention discloses a MEMS gravimeter comprising: a spring-mass system, a displacement sensing structure, a displacement detecting circuit, a cavity body and a level adjustment base; the spring-mass system is disposed inside the cavity body and includes: a negative-stiffness spring, a positive-stiffness spring, a proof mass and an outer frame; the proof mass is connected to the outer frame by the negative-stiffness spring and the positive-stiffness spring, the negative-stiffness spring and the positive-stiffness spring are symmetrically disposed with respect to the proof mass, and the outer frame is fixedly connected to the cavity body; the displacement sensing structure is located on a surface of the proof mass, and the displacement detecting circuit is configured to detect a displacement signal from the displacement sensing structure; the spring-mass system realizes reduction in resonant frequency by matching of the positive and negative stiffness springs; and change in gravitational acceleration is detected by detecting a displacement of the proof mass. The MEMS gravimeter has high stability, small (Continued)

size and light weight, and thus can effectively reduce the production cost as well as the development difficulty of the signal detection unit and stable platform.

14 Claims, 3 Drawing Sheets

(56) References Cited

FOREIGN PATENT DOCUMENTS

| | | |
|---|---|---|
| CN | 101844739 A | 9/2010 |
| CN | 102023234 A | 4/2011 |
| CN | 102375075 A | 3/2012 |
| CN | 103994760 A | 8/2014 |
| CN | 103999348 A | 8/2014 |
| WO | 2004015430 A1 | 2/2004 |

OTHER PUBLICATIONS

International Search Report and Written Opinion issued in PCT/CN2017/091111 dated Feb. 24, 2018.

* cited by examiner

MEMS GRAVIMETER

BACKGROUND OF THE INVENTION

Technical Field

The present invention belongs to the technical field of gravity measurement, and more particularly relates to a MEMS gravimeter.

Description of the Related Art

Gravimeter is an instrument for measuring gravity acceleration, which is of great significance in geophysics, underground resource exploration and other fields. At present, gravimeters can be mainly divided into two categories: one is absolute gravimeter and the other is relative gravimeter. The absolute gravimeter, which is represented by Micro-g & LaCoste's FG5-X, measures the absolute gravitational acceleration by very accurately measuring the relationship between position and time of the object falling in the vacuum. This absolute gravimeter has a very high accuracy, in which the correctness can reach 2 μGal/√Hz, and the accuracy can reach 15 μGal/√Hz (1 Gal=1 cm/s$^2$). However, the whole instrument is also very large, with a total weight of 150 kg and a total volume of 1.5 m$^3$, and its price is very expensive, reaching nearly a million dollars.

Compared with the absolute gravimeter, the relative gravimeter measures the amount of change in gravitational acceleration rather than the absolute value of the gravitational acceleration. At present, the relative gravimeter usually detects the change in gravitational acceleration by a spring-mass system composed of a proof mass, springs and an outer frame. During operation, the gravimeter is in a gravity environment, the gravity of the proof mass is balanced with the elastic force generated by the spring deformation, and thus, the proof mass is at a certain equilibrium position; when the gravity acceleration in the environment where the gravimeter is located is changed, the spring deformation is changed accordingly to produce a new balance between the elastic force generated by the spring deformation and the gravity, and the proof mass is displaced to a new equilibrium position. Thus, the change in gravitational acceleration can be detected by detecting the displacement of the proof mass, and a relationship between the change in gravitational acceleration and the displacement can be expressed as:

$$\Delta x = \Delta a / \omega_0^2$$

where $\Delta x$ represents a displacement of the proof mass, $\Delta a$ represents change in gravitational acceleration, and $\omega_0$ represents a resonant frequency of the spring-mass system. In order to make the gravimeter more sensitive to acceleration change, the resonant frequency of the spring-mass system is required to be as low as possible, which means that springs are required to be as soft as possible, or that the proof mass is required to be as large as possible.

In order to measure change in gravitational acceleration on the order of 100 ng (1 ng=10$^{-9}$ g) in the gravitational field (the gravity acceleration is denoted by g, which is about 9.8 m/s$^2$), a structure of "zero-length spring" is widely used in the relative gravimeter, so that the spring-mass system can be sensitive to change in gravitational acceleration while being subjected to gravity of 1 g. At present, commercial relative gravimeters are basically designed and manufactured based on this idea. For example, Scintrex's CG6 relative gravimeter uses a zero-length spring made of fused silica for gravity measurement, and has a mass of 5.2 kg and a measured standard repeatability of 5 μGal. However, the price of this relative gravimeter is still very expensive, reaching hundreds of thousands of dollars.

Micro-electromechanical Systems (MEMS) have become more and more mature with the development of microelectronics technology, and are continuously applied to various fields due to its unique advantages in instrument miniaturization, production cost control and the like. Currently, commercial MEMS accelerometers have been widely used in automobiles, smart phones, robots and other fields. Commercial MEMS accelerometers have been optimized with relatively high accuracy. For example, INOVA's ML21 MEMS accelerometer has an accuracy of 42 ng/√Hz, and SERCEL's DSU1 508 MEMS accelerometer has an accuracy of 15 ng/√Hz. However, the measurement accuracy and stability of the existing MEMS accelerometers still fall short of the requirements of gravimeters.

Glasgow University in the UK has reported a MEMS gravimeter based on "geometri canti-spring". With the "geometri canti-spring" design, the resonant frequency of the spring-mass system of the MEMS gravimeter is allowed to be very low, which makes it very sensitive to acceleration change. According to the report, in the MEMS gravimeter, the measurement accuracy reaches 40 μGal/√Hz, and the zero drift reaches 140 μGal/day.

SUMMARY OF THE INVENTION

In view of the above-described defects or improvement requirements in the art, the present invention provides a MEMS gravimeter capable of realizing high-precision and high-stability gravity measurement while enabling the volume and quality of the gravimeter to be effectively reduced and the manufacturing cost to be effectively limited.

In order to achieve the above objective, the present invention provides a MEMS gravimeter, comprising: a spring-mass system, a displacement sensing structure, a displacement detecting circuit, a cavity body and a level adjustment base; the spring-mass system is disposed inside the cavity body and includes: a negative-stiffness spring, a positive-stiffness spring, a proof mass and an outer frame; the proof mass is connected to the outer frame by the negative-stiffness spring and the positive-stiffness spring, the negative-stiffness spring and the positive-stiffness spring are symmetrically disposed with respect to the proof mass, and the outer frame is fixedly connected to the cavity body; the displacement sensing structure is located on a surface of the proof mass, and the displacement detecting circuit is configured to detect a displacement signal from the displacement sensing structure; the level adjustment base is disposed at a bottom of the cavity body to adjust a level of the cavity body.

Further, the negative-stiffness spring is a curved beam, and both ends of the beam are fixed, so that a displacement of the proof mass during operation enables axial deformation of the beam and an axial force inside the beam.

Further, under the action of gravity of 1 g, matching of the positive-stiffness spring and the negative-stiffness spring effectively reduces equivalent stiffness, so that a resonant frequency of the spring-mass system is less than 5 Hz.

Further, the MEMS gravimeter further comprises: a support structure fixed inside the cavity body, and the outer frame of the spring-mass system is fixed on a surface of the support structure.

Further, the support structure is a gantry structure, a material of which has a thermal expansion coefficient of less than 2.5 ppm/° C.

Further, the MEMS gravimeter further comprises: a vacuum interface and a vacuum module, and the vacuum interface is disposed on a surface of the cavity body to connect the cavity body with the vacuum module disposed outside the cavity body.

Further, the MEMS gravimeter further comprises: a temperature control module disposed inside the cavity body to maintain a stable temperature inside the cavity body.

Further, the MEMS gravimeter further comprises: a signal interface located on a surface of the cavity body to transmit a signal from the displacement sensing structure to the displacement detecting circuit.

The present invention further provides a MEMS processing method for a spring-mass system, in which the spring-mass system comprises a negative-stiffness spring, a positive-stiffness spring, a proof mass and an outer frame; the proof mass is connected to the outer frame by the negative-stiffness spring and the positive-stiffness spring; and the negative-stiffness spring and the positive-stiffness spring are symmetrically disposed with respect to the proof mass, characterized in that the MEMS processing method comprises the following steps:

(1) transferring pattern masks of the outer frame, the negative-stiffness spring, the proof mass and the positive-stiffness spring of the spring-mass system to a surface of a silicon wafer by photolithography;

(2) integrally etching the silicon wafer by deep reactive ions etching (DRIE) to obtain a semi-finished product of the spring-mass system; and (3) removing unnecessary structures in the semi-finished product of the spring-mass system by wet etching to obtain the spring-mass system.

The present invention further provides a three-axis gravimeter comprising three spring-mass systems, wherein planes where the three spring-mass systems are located are each at an angle (for example, 60° or other angles) to a horizontal plane, and the planes where the three spring-mass systems are located are at an angle (for example, 120° or other angles) to each other; each spring-mass system comprises a negative-stiffness spring, a positive-stiffness spring, a proof mass and an outer frame; the proof mass is connected to the outer frame by the negative-stiffness spring and the positive-stiffness spring, and the negative-stiffness spring and the positive-stiffness spring are symmetrically disposed with respect to the proof mass.

The present invention further provides a gravity gradiometer comprising two gravimeters described above, which are positioned a distance apart in space, so that gravitational accelerations of two points in the space where the gravimeter is located are measured, and a difference between the measured gravitational accelerations is divided by a distance between the two points to obtain a gravity gradient. A partial tensor gravity gradiometer or a full tensor gravity gradiometer may be constructed by using one or more pairs of the above-mentioned single-axis gravimeter.

In general, by comparing the above technical solution of the present inventive concept with the prior art, the present invention has the following beneficial effects:

(1) under the action of a certain gravity, the resonant frequency of the spring-mass system can reach 5 Hz or less, and thus, on the basis of the same displacement detection accuracy, the acceleration can be detected with higher accuracy;

(2) the spring-mass system is integrally formed by the MEMS technology using single crystal silicon of a near perfect lattice structure, avoiding problems such as creep of metal materials as well as the problem of unstable connection points between different devices in conventional processing, so that the spring-mass systems can achieve better stability;

(3) the spring-mass system can be made as small as 20×20×0.5 mm or less, which allows the volume and weight of the whole instrument to have the potential to shrink, making the instrument more portable while reducing the development difficulty of the moving base gravimeter; and (4) the production cost of the instrument can be effectively reduced by the ability to mass production of the spring-mass system by means of the MEMS technology.

Figure 1:
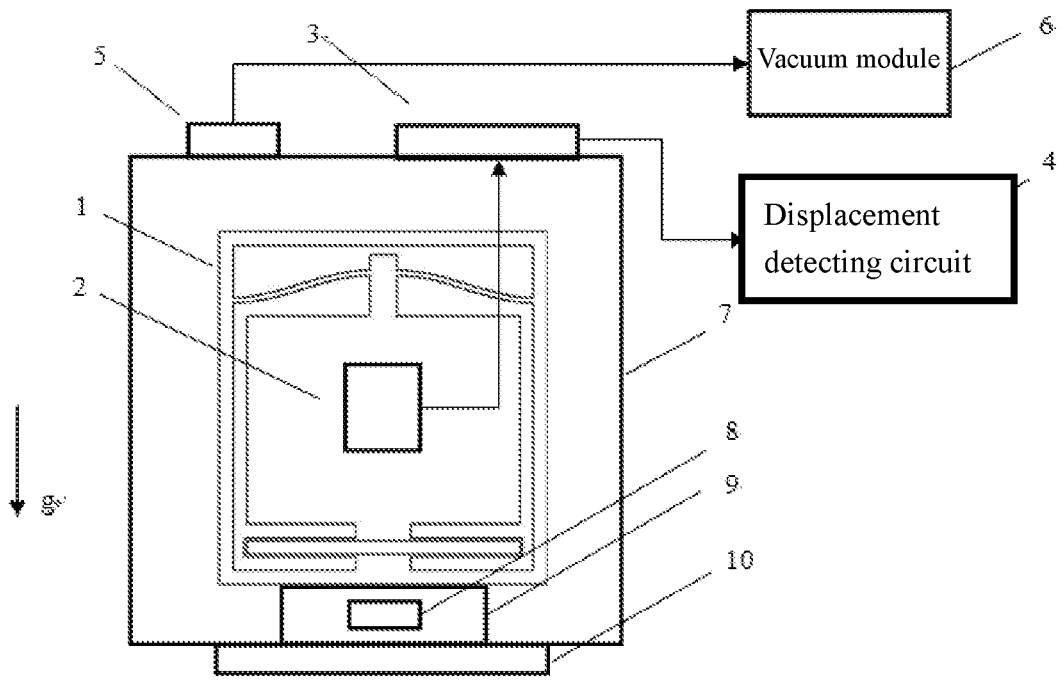
FIG. 1 is a schematic structural diagram of a MEMS gravimeter according to embodiments of the present invention.

In all figures, x-axis represents the horizontal direction, y-axis represents the direction of gravity, and g represents gravitational acceleration, and the same elements or structures are denoted by the same reference numerals, in which: 1: first spring-mass system, 2: displacement sensing structure, 3: signal interface, 4: displacement detecting circuit, 5: vacuum interface, 6: vacuum module, 7: cavity body, 8: temperature control module, 9: first support structure, 10: level adjustment base, 11: outer frame, 12: negative-stiffness spring, 13: proof mass, 14: positive-stiffness spring, 15, 16, 17: second spring-mass system with the same structure, 18: second support structure, 19: bracket.

DETAILED DESCRIPTION OF THE EMBODIMENTS

For clear understanding of the objectives, features and advantages of the present invention, detailed description of the present invention will be given below in conjunction with accompanying drawings and specific embodiments. It should be noted that the embodiments described herein are only meant to explain the present invention, and not to limit the scope of the present invention. Furthermore, the technical features related to the embodiments of the invention described below can be mutually combined if they are not found to be mutually exclusive.

The present invention provides a MEMS gravimeter comprising a spring-mass system, a displacement sensing structure, a displacement detecting circuit, a cavity body and a level adjustment base, wherein the spring-mass system comprises: a negative-stiffness spring, a positive-stiffness spring, a proof mass and an outer frame; the displacement sensing structure is located on a surface of the above-mentioned proof mass, and its signal is detected and recorded by the displacement detecting circuit; the spring-mass system is installed inside the cavity body, and the outer frame is fixedly connected to the cavity body; the level adjustment base is installed at the bottom of the cavity body to adjust the level of the cavity body.

During operation, the gravimeter is in a gravity environment, the gravity of the proof mass is balanced with the elastic force generated by the spring deformation, and the proof mass is at a certain equilibrium position; when the gravity acceleration is changed, the spring deformation is changed accordingly to produce a new balance between the elastic force generated by the spring deformation and the gravity, and the proof mass is displaced to a new equilibrium position. The displacement sensing structure converts the displacement of the proof mass into a certain detectable physical quantity (for example, capacitance, light intensity or the like), and the displacement detecting circuit detects the displacement of the proof mass by detecting the physical quantity, and then detects change in gravity acceleration.

In the embodiments of the present invention, the proof mass in the spring-mass system is connected to the outer frame by the positive-stiffness spring and the negative-stiffness spring, and the positive-stiffness spring and the negative-stiffness spring are symmetrically arranged with respect to the proof mass. Matching of the positive-stiffness spring and the negative-stiffness spring can effectively reduce equivalent stiffness, thereby reducing the resonant frequency of the spring-mass system and making the spring-mass system more sensitive to acceleration change. The resonant frequency can be effectively reduced to 5 Hz or less, and can be theoretically reduced to any frequency.

In the embodiments of the present invention, in order to reduce the influence of temperature change outside the gravimeter on the spring-mass system, the MEMS gravimeter further includes: a support structure fixed in the cavity body, and meanwhile, the outer frame of the spring-mass system is fixed on a surface of the support structure. A material with a thermal expansion coefficient of less than 2.5 ppm/° C. is selected to manufacture a gantry structure, which reduces the influence of the external temperature change on the spring-mass system while providing support for the spring-mass system.

In the embodiments of the present invention, in order to reduce the influence of airflow inside the cavity body on the spring-mass system, the MEMS gravimeter further includes: a vacuum interface and a vacuum module, in which the vacuum interface is located on a surface of the cavity body and connects the cavity body with the vacuum module. A vacuum environment is maintained in the cavity body by the vacuum module, in which the vacuum degree is maintained at 1 Pa or less, and vacuum degree change is less than 1%. The vacuum environment not only reduces the influence of the airflow on the spring-mass system, but also plays a role of passive heat insulation, which is conducive to maintaining a stable temperature inside the cavity body.

In the embodiments of the present invention, in order to avoid the influence of temperature change on the spring-mass system, the MEMS gravimeter further includes: a temperature control module located inside the cavity body to maintain a stable temperature inside the cavity body. The cavity body is maintained at a fixed temperature by closed-loop control, and the temperature change is less than $10^{-2\circ}$ C.

In the embodiments of the present invention, when the displacement sensing structure needs to be wiredly connected to the displacement detecting circuit, the MEMS gravimeter further includes: a signal interface located on a surface of the cavity body. The signal interface is mainly used to transmit a signal from the displacement sensing structure to the displacement detecting circuit.

In the embodiments of the present invention, a three-axis gravimeter can be constructed by fixedly connecting three identical low-resonant frequency spring-mass systems described above in an umbrella-shaped manner.

In the embodiments of the invention, the whole gravimeter is placed on a stable platform, and moving base gravity measurement can be achieved.

In the embodiments of the present invention, two identical gravimeters described above can be placed at two positions to respectively measure gravitational accelerations at the two positions, and then measure the gravity gradient. Furthermore, by placing multiple pairs of identical gravimeters in a combined manner, a full tensor gravity gradiometer can be constructed to achieve measurement of all tensor components of the gravity gradient.

In order to further explain the MEMS gravimeter according to the present invention, embodiments are described in detail with reference to the accompanying drawings as follows.

According to a first embodiment of the present invention, a single-axis MEMS gravimeter is provided, with its structure shown in FIG. 1. The single-axis MEMS gravimeter includes a first spring-mass system 1, a displacement sensing structure 2, a signal interface 3, a displacement detecting circuit 4, a vacuum interface 5, a vacuum module 6, a cavity body 7, a temperature control module 8, a first support structure 9, and a level adjustment base 10. An outer frame 11 of the first spring-mass system 1 is fixed to the cavity body 7 by the first support structure 9. The displacement sensing structure 2 fixed to a surface of a proof mass 13 of the first spring-mass system 1 is connected to the displacement detecting circuit 4 by the signal interface 3. The temperature control module 8 is mounted on a surface of the first support structure 9 in the vicinity of the first spring-mass system 1; and the cavity body 7 is connected to the vacuum module 6 by the vacuum interface 5. The level adjustment base 10 is mounted on a bottom surface of the cavity body 7.

Figure 2:
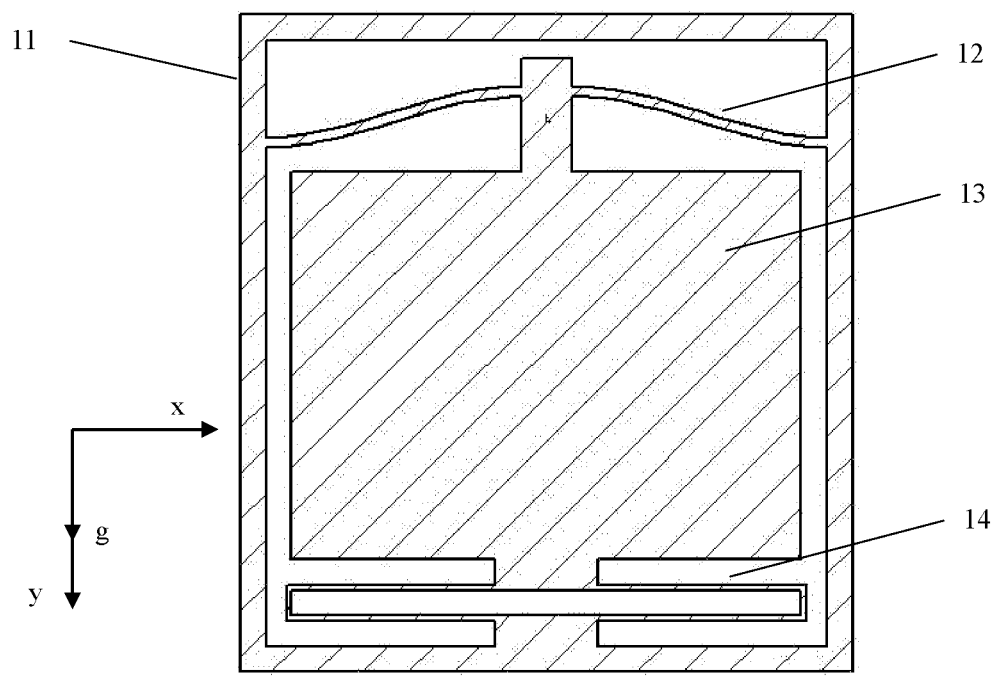
FIG. 2 is a schematic structural diagram of a low-resonant frequency spring-mass system according to the embodiments of the present invention.

Under the action of gravity of 1 g, the first spring-mass system 1 can reach a very small resonant frequency of less than 5 Hz, thereby forming a single-axis MEMS gravimeter. A schematic structural diagram of the first spring-mass system 1 is as shown in FIG. 2, in which the proof mass 13 of the first spring-mass system 1 is connected to the outer frame 11 by a negative-stiffness spring 12 and a positive-stiffness spring 14. The sensitive axis is along the y-axis direction, i.e., the direction of gravity g.

The negative-stiffness spring 12 is a curved beam that is fixed at both ends when there is no load. When the first spring-mass system 1 is in a horizontal state, the negative-stiffness spring 12 is in a symmetrical curved shape, and its curved shape has many designs, such as a form of cosine curve and "V" shape. Taking the form of cosine curve as an example, an elastic force-displacement curve of this curved beam is shown by the dotted line in FIG. 3, in which the horizontal axis represents a normalized displacement of the proof mass, and the positive value is along the +y direction; the vertical axis represents a normalized elastic force of the spring and the positive value is along the −y direction. When the proof mass 13 is displaced along the +y direction, the negative-stiffness spring 12 in the form of cosine curve produces an elastic force along the −y direction, as shown in a region I: as the displacement increases, the elastic force increases until it reaches the positive maximum value. As the displacement of the proof mass 13 continues to increase, the elastic force will decrease from the positive maximum value to 0, and even begin to increase in the +y direction until it reaches the negative maximum value, as shown in a region II, which is a negative-stiffness region utilized in the present invention. The reason for this phenomenon is that the negative-stiffness spring 12 is fixed at both ends so that the displacement of the proof mass 13 enables axial deformation of the beam, resulting in generation of an axial force inside the beam. After the proof mass 13 is displaced to a certain position, it will start to work on the surrounding and generate negative stiffness. As the displacement of the proof mass 13 continues to increase, the elastic force may increase along the −y direction from the negative maximum value, as shown in a region III.

Figure 3:
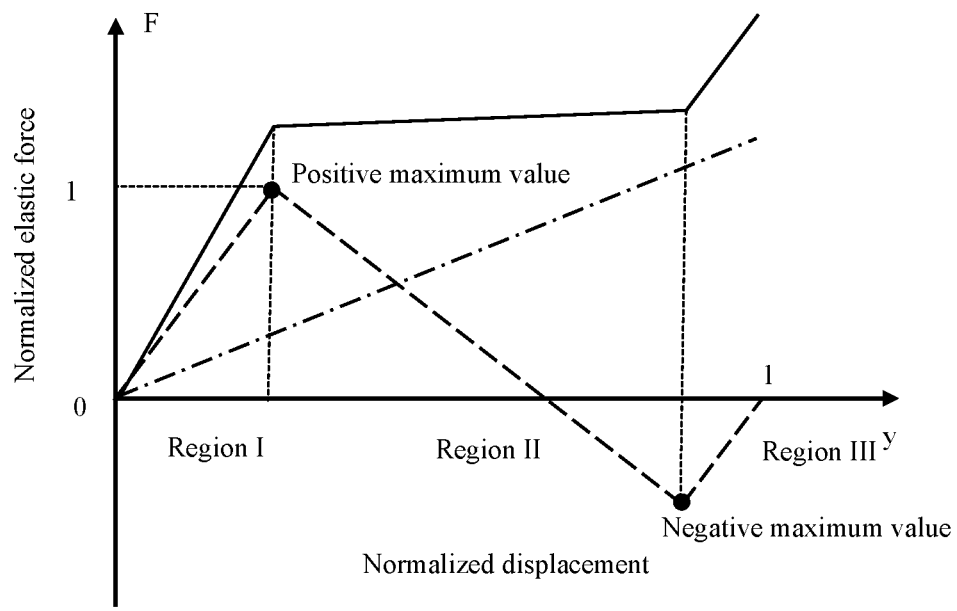
FIG. 3 is a diagram showing a force-displacement curve of the low-resonant frequency spring-mass system according to the embodiments of the present invention.

The positive-stiffness spring 14 is a commonly used folded beam whose elastic force-displacement curve is shown by a dash dot line in FIG. 3. As the displacement of the proof mass 13 increases, the elastic force of the positive-stiffness spring 14 increases linearly. A combined equivalent force-displacement curve of the two springs is shown by a solid line in FIG. 3, and their equivalent stiffness is effectively reduced in a region II. By adjusting shapes or geometrical parameters (such as beam length and width) of the negative-stiffness spring 12 and the positive-stiffness spring 14, bending amplitude of the negative-stiffness spring 12 and the like, an absolute value of the negative stiffness of the negative-stiffness spring 12 is allowed to be close to an absolute value of the positive stiffness of the positive-stiffness spring 14, so that the positive stiffness and the negative stiffness can cancel out and thus a structure with a very small equivalent stiffness can be obtained. When the equivalent stiffness is positive, the spring-mass system is still a stable system and can perform open loop detection; when the equivalent stiffness is negative, the system is unstable, and the proof mass 13 is prone to jump, in which case, it is necessary to add a feedback actuator to perform closed loop control such that the proof mass 13 is stabilized at a fixed position in the region II. Meanwhile, the quality of the proof mass 13 is adjusted such that under the action of gravitational acceleration of 1 g, the equilibrium position of the first spring-mass system 1 is located in the region II in FIG. 3. In addition, this symmetrical design has a good inhibiting effect on other vibration modes of the spring-mass system.

The above-mentioned spring-mass system 1 can be manufactured by the MEMS processing technology using single crystal silicon, and main processes required are: pattern transfer, etching, release and the like. Processing steps are as follows: (1) transferring pattern masks of the outer frame 11, the negative-stiffness spring 12, the proof mass 13 and the positive-stiffness spring 14 of the designed spring-mass system 1 to a surface of a silicon wafer by photolithography; (2) integrally etching the silicon wafer by using deep reactive ions etching (DRIE) to obtain a spring-mass system; and (3) removing unnecessary structures by wet etching to release the spring-mass system. In such a way of integrated processing, mechanical connection structures are avoided, thereby eliminating the problem of unstable connection structures.

The displacement sensing structure 2 is formed on a surface of the proof mass 13 of the first spring-mass system 1 by a certain processing method. The displacement sensing structure 2 is connected to the displacement detecting circuit 4 by the signal interface 3. One possible solution is to manufacture a capacitive displacement sensor. A capacitance plate is formed on a surface of the proof mass 13 of the first spring-mass system 1 as a movable plate, and a fixed plate is fixed directly above the movable plate. When the proof mass 13 is displaced, the movable plate is also displaced along with the proof mass 13, resulting in capacitance change between the movable plate and the fixed plate. The signal interface 3 adopts a vacuum matched ceramic electrode. The displacement detecting circuit 4 is correspondingly designed as a capacitance detection circuit, which is capable of detecting a displacement of the proof mass 13 through detecting the capacitance change. The entire displacement detection accuracy can reach the order of nm or even pm.

The first support structure 9 is a structure that fixedly connects the outer frame 11 in the first spring-mass system 1 to the cavity body 7, and can be made into a gantry structure using glass ceramics with a particularly small thermal expansion coefficient. The first support structure 9 provides a heat-insensitive support such that the first spring-mass system 1 and the cavity body 7 are less prone to be displaced, and meanwhile provides a certain isolation effect on temperature change of the cavity body.

The temperature control module 8 is mounted on a surface of the first support structure 9 to control the temperature of the first spring-mass system 1. A closed-loop feedback control loop is formed by a thermistor and a heater, so that temperature change of the first spring-mass system is controlled within $10^{-3}$° C.

The cavity body 7 is connected to the vacuum module 6 by the vacuum interface 5 to form a vacuum system, which provides a stable vacuum environment for the first spring-mass system 1, the displacement sensing structure 2 and the like. The vacuum interface 5 uses a CF16 type interface, and the vacuum module 6 uses an ion pump for vacuum maintenance, so that the vacuum degree of the cavity body 7 can be maintained at less than $10^{-4}$ Pa.

The level adjustment base 10 is mounted on a bottom surface of the cavity body 7 to adjust the level such that the sensitive axis of the first spring-mass system 1 has the same direction as the gravity.

During operation, the sensitive axis of the gravimeter is allowed to coincide with the gravity direction by the level adjustment base 10. The cavity body 7, the vacuum interface 5 and the vacuum module 6 maintain the vacuum degree of the cavity body 7 at less than $10^{-4}$ Pa. The temperature control module 8 controls the temperature by a closed loop such that the temperature inside the cavity body 7 is maintained at a certain temperature, with temperature change of less than $10^{-3}$° C. When the entire instrument is in a gravitational field, the proof mass 13 of the first spring-mass system 1 is subjected to gravity, and the negative-stiffness spring 12 and the positive-stiffness spring 14 of the first spring-mass system 1 are deformed to generate elastic forces such that the proof mass 13 is balanced at a position in the region II where the equivalent stiffness is small; when the gravitational acceleration is changed, the deformation of the negative-stiffness spring 12 and the positive-stiffness spring 14 is changed accordingly to balance the elastic force generated by the spring deformation with the gravity, so that the proof mass 13 is displaced to a new equilibrium position. The displacement of the proof mass 13 leads to capacitance change of the above capacitive displacement sensing structure 2, and the capacitance change is transmitted to the displacement detecting circuit 4 through the signal interface 3. The displacement detecting circuit 4 detects this capacitance change, thereby detecting the displacement of the proof mass 13 and then detecting change in gravitational acceleration of the gravitational field.

In this embodiment, the matching of the positive and negative-stiffness springs effectively reduces the resonant frequency of the spring-mass system, thereby increasing the coefficient of acceleration conversion into displacement. In a case where the displacement detection accuracy is fixed, the detection accuracy in the acceleration is effectively improved. The spring-mass system is integrally formed by using single crystal silicon, which reduces mechanical connection points and effectively improves the stability of the structure. Meanwhile, the vacuum module, the support structure and the temperature control module provide an environment with stable air pressure and stable temperature for the detecting units such as the spring-mass system and the displacement sensing structure, so that the accuracy and stability of the instrument can be effectively improved.

Figure 4:
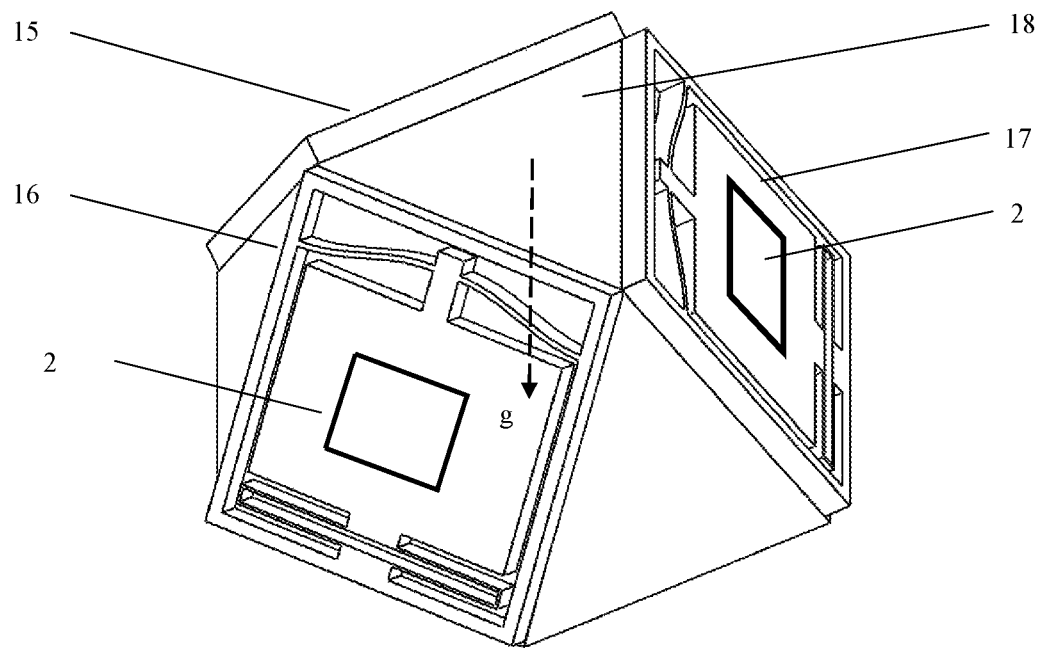
FIG. 4 is a schematic diagram of a three-axis gravimeter fixed in an umbrella shape.

According to a second embodiment of the present invention, a three-axis gravimeter is provided, with its sensitive structure shown in FIG. 4. Three identical second spring-mass systems 15, 16 and 17 are mounted on surfaces of a second support structure 18. The second support structure 18 is a boss made of glass ceramics with a particularly small thermal expansion coefficient. Planes where the three identical second spring-mass systems 15, 16 and 17 are located are each at an angle (for example, 60°) to a horizontal plane, and the planes where the three identical second spring-mass systems 15, 16 and 17 are located are at an angle to each other, so that the component of gravity in the direction of the respective sensitive axis of the second spring-mass systems 15, 16 and 17 is g·sin 60°. With such a design, components of the gravitational acceleration in three directions can be measured by the three second spring-mass systems 15, 16 and 17, thereby achieving vector measurement of the gravitational acceleration.

The second spring-mass systems 15, 16 and 17 are similar in structure to the first spring-mass system 1. In this case, description is given by taking the structure of the first spring-mass system 1 as an example: by adjusting shapes or geometrical parameters (such as beam length and width) of the negative-stiffness spring 12 and the positive-stiffness spring 14, bending amplitude of the negative-stiffness spring 12 and the like, an absolute value of the negative stiffness of the negative-stiffness spring 12 is allowed to be close to an absolute value of the positive stiffness of the positive-stiffness spring 14, so that the positive stiffness and the negative stiffness cancel out, and thus, a structure with a very small equivalent stiffness can be obtained. Meanwhile, the quality of the proof mass 13 is adjusted such that under the action of the gravitational acceleration of g·sin 60°, the equilibrium position of the first spring-mass system 1 is located in the region II in FIG. 3. With such a design, second spring-mass systems 15, 16 and 17 can be obtained.

Accordingly, a displacement sensing structure 2 can be provided on a surface of the respective roof mass of the second spring-mass systems 15, 16 and 17 to detect the displacement of the proof mass.

Based on the first embodiment, the first spring-mass system 1 and the first support structure 9 are replaced with the second spring-mass systems 15, 16 and 17 and the second support structure 18, and a signal interface 3 and a displacement detecting circuit 4 are accordingly added, in which way a three-axis gravimeter can be manufactured.

Figure 5:
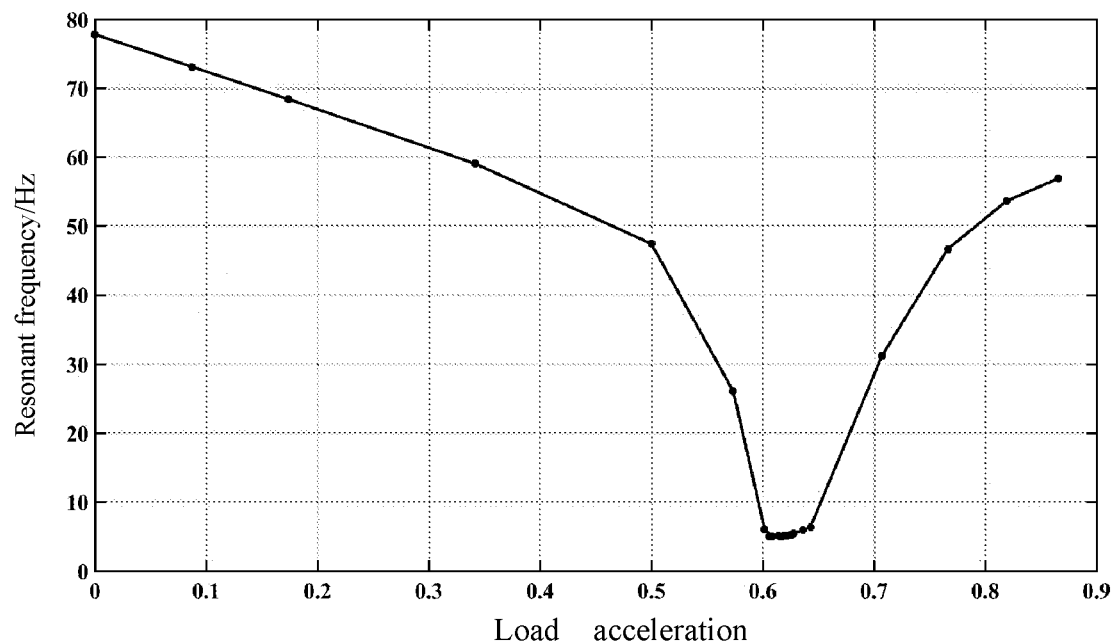
FIG. 5 is a diagram showing a changing curve of the resonant frequency of an accelerometer fabricated according to design over load.

FIG. 5 is a diagram showing change in resonant frequency of the MEMS spring-mass system according to the above design concept as the load acceleration changes. It can be seen from the figure that as the load acceleration increases, the resonant frequency of the spring-mass system continuously decreases, and after reaching the lowest point, it starts to rise. This is very consistent with the trend expected in FIG. 3, which proves that the design method for the spring-mass system in the present invention is feasible.

Figure 6:
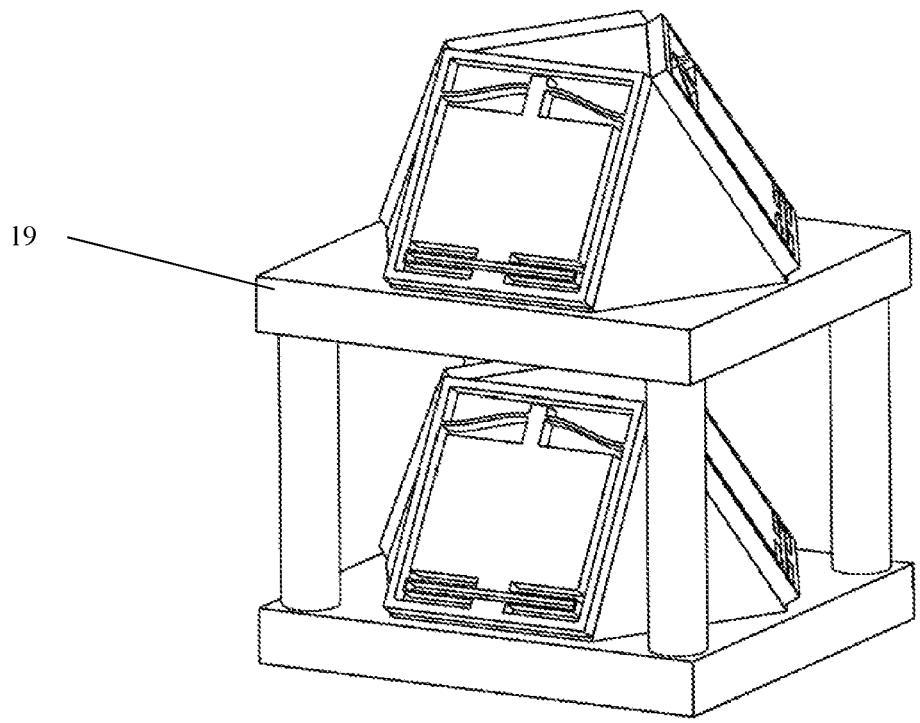
FIG. 6 is a diagram showing a gravity gradiometer consisting of two identical three-axis gravimeters described above.

In another embodiment of the present invention, a gravity gradiometer can be formed as follows: two identical three-axis gravimeters are placed on surfaces of a bracket 19 such that they are spatially spaced by a certain distance, as shown in FIG. 6. Gravity gradient is the derivative of gravity acceleration with respect to space, and by measuring gravitational accelerations at two points in space, the gravity gradient can be detected by difference operation. The gravity gradient can be expressed as: $\Gamma=(g_1-g_2)/d$, where $g_1$ and $g_2$ represent gravitational accelerations at two positions measured by the above-mentioned two three-axis gravimeters, and d represents a spacing between the two points. Similarly, the bracket 19 is fabricated using glass ceramics or ULE material with a particularly small thermal coefficient expansion.

It should be readily understood to those skilled in the art that the above description is only preferred embodiments of the present invention, and does not limit the scope of the present invention. Any change, equivalent substitution and modification made without departing from the spirit and scope of the present invention should be included within the scope of the protection of the present invention.

What is claimed is:

1. A MEMS gravimeter, characterized by comprising: a spring-mass system, a displacement sensing structure, a displacement detecting circuit, a cavity body and a level adjustment base;

the spring-mass system is disposed inside the cavity body and includes: a negative-stiffness spring, a positive-stiffness spring, a proof mass and an outer frame; the proof mass is connected to the outer frame by the negative-stiffness spring and the positive-stiffness spring, the negative-stiffness spring and the positive-stiffness spring are each symmetrically disposed with respect to a vertical axis of the proof mass, and the outer frame is fixedly connected to the cavity body;

the displacement sensing structure is located on a surface of the proof mass, and the displacement detecting circuit is configured to detect a displacement signal from the displacement sensing structure;

the level adjustment base is disposed at a bottom of the cavity body to adjust a level of the cavity body.

2. The MEMS gravimeter of claim 1, characterized in that the negative-stiffness spring is a curved beam, and both ends of the beam are fixed, so that a displacement of the proof mass during operation enables axial deformation of the beam and an axial force inside the beam.

3. The MEMS gravimeter of claim 2, wherein the curved beam has a cosine curve.

4. The MEMS gravimeter of claim 1, characterized in that under the action of gravity of 1 g, matching of the positive-stiffness spring and the negative-stiffness spring effectively reduces equivalent stiffness, so that a resonant frequency of the spring-mass system is effectively reduced.

5. The MEMS gravimeter of claim 1, characterized in that the MEMS gravimeter further comprises: a support structure fixed inside the cavity body, and the outer frame of the spring-mass system is fixed on a surface of the support structure.

6. The MEMS gravimeter of claim 5, characterized in that the support structure is a gantry structure, a material of which has a thermal expansion coefficient of less than 2.5 ppm/° C.

7. The MEMS gravimeter of claim 1, characterized in that the MEMS gravimeter further comprises: a vacuum interface and a vacuum module, and the vacuum interface is disposed on a surface of the cavity body to connect the cavity body with the vacuum module disposed outside the cavity body.

8. The MEMS gravimeter of claim 1, characterized in that the MEMS gravimeter further comprises: a temperature control module disposed inside the cavity body to maintain a stable temperature inside the cavity body.

9. The MEMS gravimeter of claim 1, characterized in that the MEMS gravimeter further comprises: a signal interface located on a surface of the cavity body to transmit a signal from the displacement sensing structure to the displacement detecting circuit.

10. The MEMS gravimeter of claim 1, wherein the displacement detection circuit is configured to detect light intensity.

11. A MEMS processing method for a spring-mass system, in which the spring-mass system comprises a negative-stiffness spring, a positive-stiffness spring, a proof mass and an outer frame; the proof mass is connected to the outer frame by the negative-stiffness spring and the positive-stiffness spring; and the negative-stiffness spring and the positive-stiffness spring are each symmetrically disposed with respect to a vertical axis of the proof mass, characterized in that the MEMS processing method comprises the following steps:

(1) transferring pattern masks of the outer frame, the negative-stiffness spring, the proof mass and the positive-stiffness spring of the spring-mass system to a surface of a silicon wafer by photolithography;

(2) integrally etching the silicon wafer by deep reactive ions etching (DRIE) to obtain a semi-finished product of the spring-mass system; and (3) removing unnecessary structures in the semi-finished product of the spring-mass system by wet etching to obtain the spring-mass system.

12. A three-axis gravimeter, characterized by comprising three spring-mass systems, wherein planes where the three spring-mass systems are located are each at an angle to a horizontal plane, and the planes where the three spring-mass systems are located are at an angle to each other; each spring-mass system comprises a negative-stiffness spring, a positive-stiffness spring, a proof mass and an outer frame; the proof mass is connected to the outer frame by the negative-stiffness spring and the positive-stiffness spring, and the negative-stiffness spring and the positive-stiffness spring are each symmetrically disposed with respect to a vertical axis of the proof mass.

13. A gravity gradiometer, characterized by comprising: two gravimeters of claim 12, which are positioned a distance apart in space, so that gravitational accelerations of two points in the space where the gravimeter is located are measured, and a difference between the measured gravitational accelerations is divided by a distance between the two points to obtain a gravity gradient.

14. The three-axis gravimeter of claim 12, wherein the planes where the three spring-mass systems are located are at 120° angles to each other.

* * * * *